United States Patent [19]
Bowell

[11] 3,861,358
[45] Jan. 21, 1975

[54] ANIMAL WATERING DEVICE

[76] Inventor: James P. Bowell, 494 Villaume Ave., South Saint Paul, Minn. 55075

[22] Filed: Oct. 25, 1973

[21] Appl. No.: 409,470

[52] U.S. Cl. ............................................... 119/79
[51] Int. Cl. ............................................ A01k 07/02
[58] Field of Search ............. 119/78, 79, 80, 74, 81

[56]  References Cited
UNITED STATES PATENTS

| | | |
|---|---|---|
| 1,548,720 | 8/1925 | Lewis .................................. 119/78 |
| 1,928,103 | 9/1933 | Hill .................................. 119/80 X |
| 3,157,160 | 11/1964 | Osier .................................. 119/79 |
| 3,610,206 | 10/1971 | Davis .................................. 119/78 |

Primary Examiner—Hugh R. Chamblee
Attorney, Agent, or Firm—Neil B. Schulte

[57] ABSTRACT

An animal watering device operable to either sit on the floor or be hung from above. A water inlet channel is positioned along an axis at the center of balance of the device, the flow of water through said inlet tube being regulated by a float positioned to exert maximum leverage against the end of said water inlet tube.

10 Claims, 5 Drawing Figures

PATENTED JAN 21 1975 3,861,358

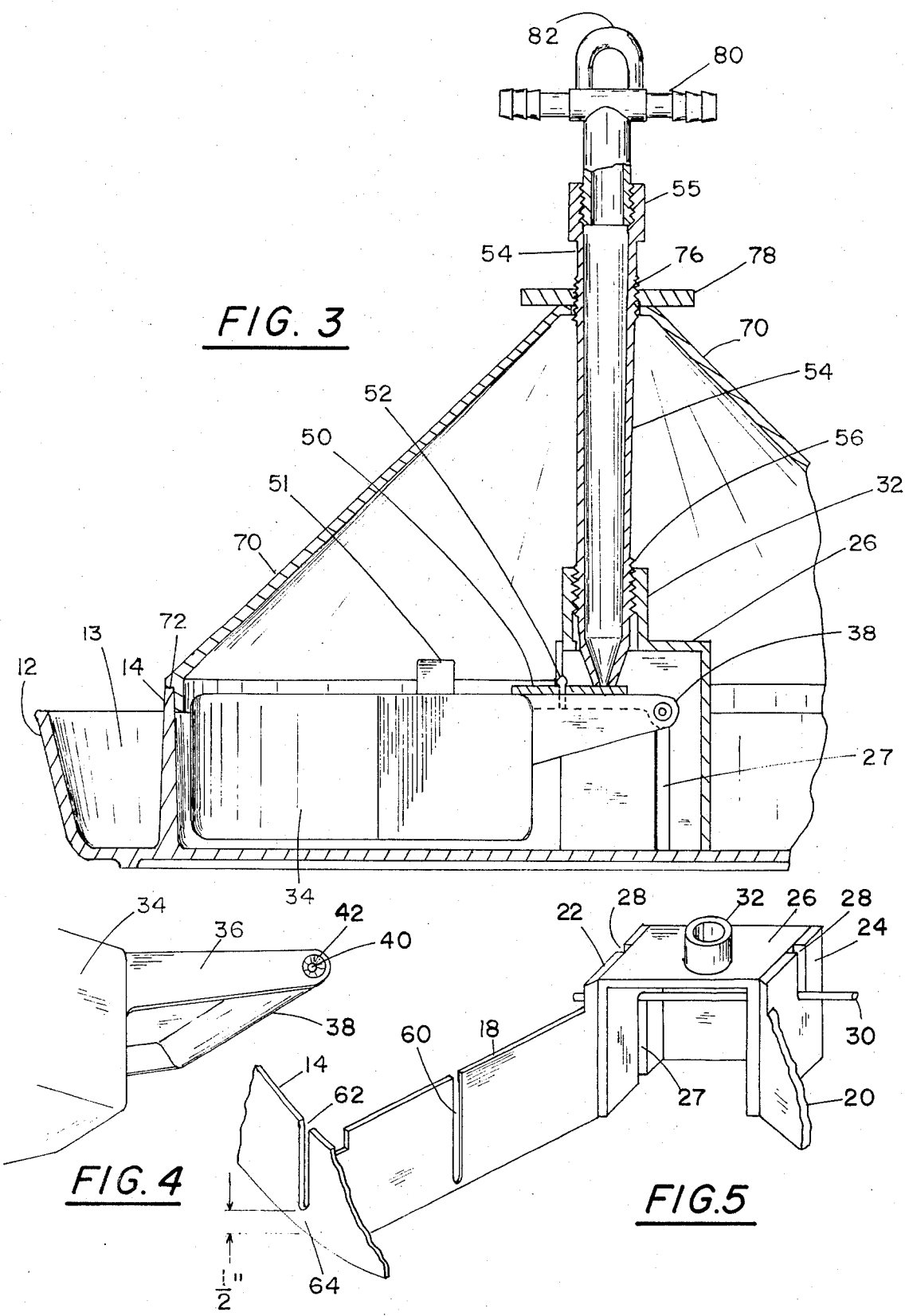

ANIMAL WATERING DEVICE

BACKGROUND OF THE INVENTION

The prior art recognizes a variety of different animal watering fountains, particularly in the poultry field. It would be highly desirable if these fountains could be used both in a sitting position on the floor and in a hanging position carried by an overhead support. It would also be desirable if they could be connected directly to a water supply line. To accomplish this, however, it is necessary to provide some means therein for regulating the flow of incoming water so as to maintain the water level at a predetermined height. Such an arrangement does away with the necessity of refilling the watering devices periodically. The prior art, however, has never been able to produce a watering device which can combine all of these features. The water flow regulating means invariably makes the watering device too complex and expensive, or unbalances it so it can not be hung conveniently or otherwise interferes with the watering function. My invention, on the contrary, incorporates a unique new design approach permitting the above objectives as explained below.

SUMMARY OF THE INVENTION

Briefly, the preferred embodiment of my invention, as disclosed herein, is specifically intended for the watering of chicks. It should be understood that any type of animal may be watered from the device of my invention by making appropriate dimensional changes in the watering trough suitable to the animal in question. For the purposes of the explanation herein, however, the preferred embodiment is described with respect to poultry waterers and particularly those adapted for chicks.

In order to permit the watering device to be hung from above it is necessary that the waterer be designed symetrically about a central axis so that it hangs in a level position from a central hook. This requirement has generally precluded the possibility of having a water supply connection to the watering device since such connections tend to throw the watering device off balance. Consequently, in the prior art, it has been necessary to remove each watering device and manually refill it every day which is very tedious, time consuming and expensive task. My invention overcomes this problem by routing the incoming water through an inlet channel positioned concentrically about the central axis of the watering device. The water inlet tube is terminated at its lower end by means of a float operated gasket which closes off the supply of water when the level of water in the device reaches a predetermined height. The float is contained in a special anti-wave compartment so that its operation is stable and controlled. The inlet opening between the gasket and the inlet water tube is contained in a chamber so as to prevent spray therefrom from splashing about and frightening the chicks. A unique pivot arrangement is used on the float to provide a large leverage sufficient to ensure that the water is shut off regardless of the line pressure.

To permit adjustment of the water level and the rate of water flow from the inlet tube the inlet tube is provided with threads so that it may be adjusted vertically relative to the float and gasket. This results in a structure which is very difficult to mold from plastic, as is the case with most watering devices, if it were not for the unique combination of partitions and surfaces from which the present invention is comprised. This structure is explained in greater detail with respect to the detailed description of the invention.

In brief, then, the present invention provides a much improved watering device for animals that has as its object the provision of a device which can be set on the floor or hung from above while still maintaining a capability for the automatic admission of water. It is a further object of my invention to produce such a waterer at a relatively modest cost. My invention accomplishes these objects and many more as will be seen from the following description and drawings.

BRIEF DESCRIPTION OF THE DRAWINGS

FIG. 3 is a side elevational view, partially sectioned, and partially cut away, taken along the plane defined by line 3—3 in FIG. 1. The view of FIG. 3 includes the cone shaped anti-perch member and the water inlet tube.

FIG. 4 is a perspective detail view of the pivot end of the float to show the construction details thereof.

FIG. 5 is a perspective detail view of the anti-splash chamber, float compartment, pivot pin, and water passageway structure.

DESCRIPTION OF THE PREFERRED EMBODIMENT

Figure 1:
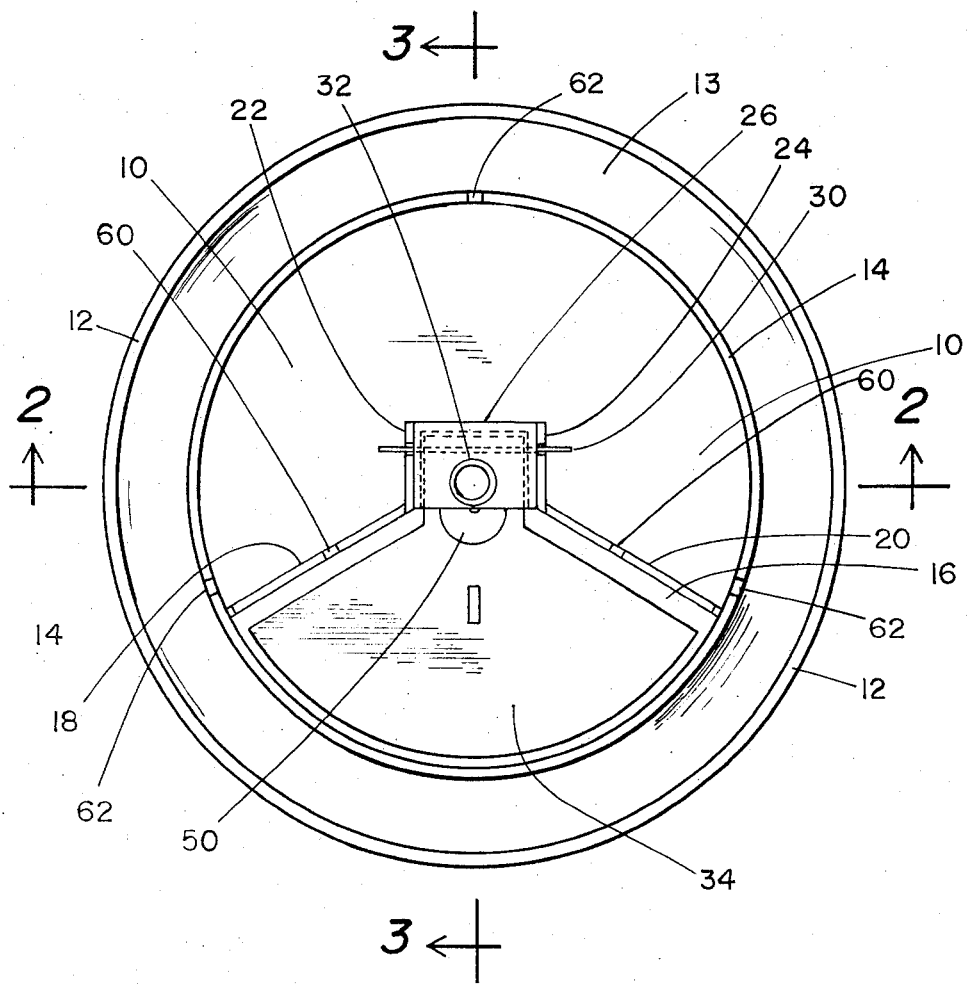
FIG. 1 is a top view of the base and float assembly of the watering device of my invention. The inlet water tube and the anti-perch member are omitted for better clarity.
Figure 2:
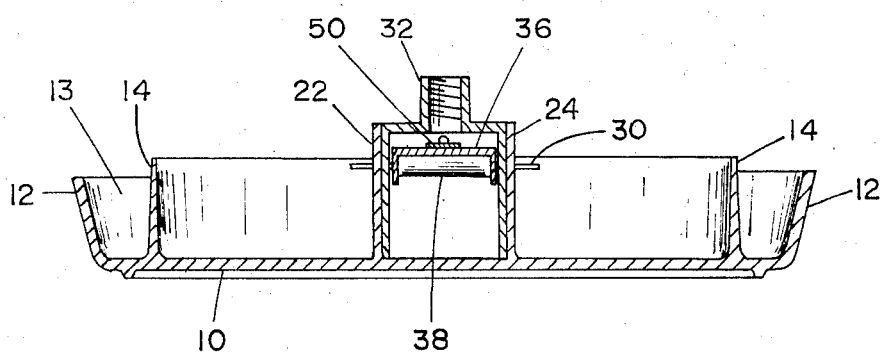
FIG. 2 is a side elevational sectional view of the base and float assembly taken along line 2—2 in FIG. 1.

Referring simultaneously to FIGS. 1 and 2 my invention is shown in top and side sectional views. A molded plastic base 10 is provided with a circumferential wall 12 extending generally upward from the periphery of the base 10. A second inner circumferential wall 14 is also formed during molding extending upwards from base 10 to form a circumferential watering trough 13 between walls 12 and 14. In the area enclosed by wall 14 a compartment 16 having a wedge or pie-shape is formed by means of a pair of upwardly extending molded partitions 18 and 20. Partitions 18 and 20 are molded integrally with the base 10 and include additional angled portions 22 and 24 which are also molded at the same time. The configuration of compartment 16 and partitions 18, 20, 22 and 24 may be more readily seen in the perspective view of FIG. 5.

In FIG. 5 it may be seen that partitions 18 and 20 extend in from wall 14 towards the center of the watering device. Partition portions 22 and 24 are made somewhat higher and are molded in parallel configuration to accept therebetween a generally box shaped anti-splash chamber 26. In the preferred embodiment it is evident that base 10, walls 12 and 14, partitions 18, 20, 22 and 24 are all molded from a single piece of plastic and furthermore, since they involve no horizontal irregularities, they can be molded with a straight draw mold which is simple, straightforward, and inexpensive. Chamber 26 is formed from a separate straight draw molding process and therefore it is unnecessary in the manufacture of this device to utilize cam action molds which would greatly increase the cost of construction. Anti-splash chamber 26 is slipped between partitions 22 and 24 and glued or sonically welded in place to form compartment 16 which receives the incoming water. As can be partly seen in FIG. 5 chamber 26 is provided with vertical slots 27 on both sides which extend up from the bottom and overlap the ends of a pair of slots 28 molded into the top of partitions 22 and 24. The overlap of slots 27 and 28 provide openings through which a pivot pin 30 is inserted. Since the slots are formed during the molding of anti-splash chamber 26 and base 10 no additional cost is incurred in providing a mounting for pivot pin 30. The additional step of drilling a hole suitable to accomodate pin 30, again, would increase the cost of construction. Chamber 26 is molded to also have a water inlet tube receiving portion 32. The operation of receiving portion 32 is described in detail with respect to the water inlet tube structure.

Referring now to FIG. 1, FIG. 3, and FIG. 4 the float structure may be seen. Pivoted about pin 30 is a pie-shaped float 34 which has a pivot arm 36 extending from the narrow end thereof generally into the chamber 26. Pivot arm 36 has an enlarged portion 38 at the end through which a hole 40 is formed. Pivot pin 30 passes through hole 40 to provide a pivot axis for float 34. The ends of hole 40 expand conically outward to a larger diameter to form a cone 42 so as to facilitate easy insertion of pin 30 into hole 40. The float is simply positioned in compartment 16, fitting rather snugly as shown in FIG. 1, and pivot pin 30 is inserted. Cone 42 ensures that the enlarged portion 38 is automatically raised into alignment with pin 30. A finger tab 51 permits float 34 to be easily grasped.

On top of float arm 36 is a suitable sealing gasket 50 which may comprise rubber or the like. Gasket 50 is disc shaped and snapped over the top of a projection 52 on arm 36. Gasket 50 bears against the bottom end of the inlet water feed tube 54 as can be seen most clearly in FIG. 3.

In FIG. 3 water inlet tube 54 is clearly shown threaded into receiving portion 32. A set of threads 56 permits water feed tube 54 to be adjusted vertically to ensure the precise desired flow of water and the precise desired level of water in compartment 16. In FIG. 3 float 34 is shown in the raised or floating position with gasket 50 pressed tightly against the bottom of water feed tube 54 thus closing off the supply of water. Obviously, as the water leaves compartment 16, float 34 lowers thus admitting water from water feed pipe 54 into compartment 16. Initially the small opening between gasket 50 and water feed tube 54 can cause an excessive amount of spray. This spray is contained inside anti-splash chamber 26. The water fills compartment 16 and flows out through suitable passageways in partitions 18 and 20 into the area enclosed by circumferential wall 14. The suitable passageways in the preferred embodiment are shown as slots 60 which again are chosen for their ease of molding. The water passes from the area inside circumferential wall 14 to the circumferential watering trough 13 through another set of slots 62. Slots 62 are molded so as to have a small sediment dam 64 at the bottom thereof to ensure that dirt, feed, and other debris accumulating in the watering trough does not pass back into the inside of the watering device. The height of the sediment dam is chosen, in the preferred embodiment, to be approximately ½ inch although other dimensions could be chosen as well.

Returning to FIG. 3 it may be seen that a cone shaped anti-perch cover member 70 is snapped down onto circumferential wall 14 by means of a step 72 molded into the lower edge of cover 70. Anti-perch member 70 prevents birds from jumping up on the device and distrubing the mechanism. Water feed tube 54 extends up through a hole at the top of anti-perch member 70 and is provided with another set of threads 76 thereon about which is mounted a thumb wheel 78. Thumb wheel 78 may be tightened down on top of anti-perch member 70 to lock it in place against circumferential wall 14 and also to ensure that water feed tube 54 is locked in place at its predetermined vertical adjustment. This arrangement is particularly advantageous permitting easy and quick disassembly of the unit for cleaning. Thumb wheel 78 is simply loosened so that base 10 may be rotated relative to water inlet tube 54. Water inlet tube 54 may then be screwed out of receiving portion 32 very quickly, thus, separating the base, the anti-perch member 70 and the watering tube for easy cleaning and inspection.

The top of water inlet tube 54 is provided with a threaded portion 55 which accepts a threaded T-connection 80. T-connection 80 allows a number of watering devices to be connected to a common water line simply by fastening a hose over each end of T-connection 80. A small loop 82 is molded onto the top of T-connection 80 to permit the watering device to be hung from a point coincident with its central axis. Since the water connection is also made coincident with this balance axis through tube 54, the incoming water does not disturb the balance of the device even when it is hung from a single overhead support by means of loop 82. The incoming water passes down along the balance axis and is distributed into splash chamber 26 and thence compartment 16. From there the water flows evenly outward to the watering trough 13 avoiding any unbalance.

Gasket 50 may be rotated about screw 52 so as to present a fresh sealing surface to the lower end of inlet tube 54 as necessary. Since the water connections are made via T-connection 80 high above the watering device it is not necessary that the water hoses lie on the floor when the fountain is on the floor. If hoses lie on the floor the birds tend to disturb them and perch on them.

It is clear that a number of different design choices may be made in the production of my invention without departing from the scope and spirit thereof. For example, it is contemplated that the present watering device may be used for many different animals simply by changing the base 10 to a larger diameter to accomodate larger chicks or birds or other animals. In order to do this it is not necessary to purchase new water connection elements such as inlet tube 54, T-connection 80 or anti-perch member 70. The only thing that need be changed is the physical dimensions of the base. Consequently, if it is desired to use the watering devices for larger birds or other stock it is only necessary to purchase a new base having the appropiate dimensions. Consequently, since a number of straightforward design changes are possible we intend to be limited only to the following appended claims.

I claim:

1. An animal watering device comprising in combination:

a base having a first circumferential wall extending upward from the perimeter of said base and a second circumferential wall inside said first wall also extending upward from said base so as to form a circumferential watering trough between said first and second walls;

a compartment means extending over a portion of the area inside said second circumferential wall, said compartment means formed at least partly by partitions extending upward from said base, said portion of the area extending from proximate the second circumferential wall generally to the center of the area inside said second circumferential wall;

a water feed tube positioned generally along and concentric with an axis extending perpendicular from said center of the area inside said second circumferential wall, said tube adjustably fastened to said compartment means so as to be movable along said axis, and said tube adapted at its upper end to connect to a common water supply;

a float in said compartment means pivoted near the bottom of said water feed tube, said float having a sealing member thereon positioned to rise with the rising water level under said float into place against the bottom of said feed tube to regulate the flow of water into the compartment means; and passageway means between said circumferential trough and said compartment means.

2. The watering device of claim 1 including an anti-perch member extending from the top of said second circumferential wall upward toward the top of said water feed tube.

3. The watering device of claim 2 including a locking means threadably mounted on said water feed tube so as to bear against the top of said anti-perch member.

4. The watering device of claim 1 in which said water feed tube is threaded at its lower end into a water receiving chamber means which chamber means generally surrounds the pivot axis portion of said float and forms part of said compartment means.

5. The water device of claim 4 in which the float pivots about a pivot pin carried in the openings fromed by the overlap of slots formed in said chamber means and slots formed in said partitions forming the compartment means.

6. The watering device of claim 1 in which said passageway means comprise at least one slot in said second circumferential wall and at least one slot in said compartment partitions, at least some of the passageway means slots having limited depth to prevent passage of sediment from the circumferential trough to the compartment means.

7. The watering device of claim 3 in which said water feed tube is threaded at its lower end into a water receiving chamber means which chamber means generally surrounds the pivot axis portion of said float and forms part of said compartment means.

8. The watering device of claim 7 in which the float pivots about a pivot pin carried in the openings formed by the overlap of slots formed in said chamber means and slots formed in said partitions forming the compartment means.

9. The watering device of claim 8 in which said passageway means comprise at least one slot in said second circumferential wall and at least one slot in said compartment partitions, at least some of the passageway means slots having limited depth to prevent passage of sediement from the circumferential trough to the compartment means.

10. The device of claim 9 in which said float has a hole through one end to accept said pivot pin said hole being cone shaped at the ends to facilitate manual insertion of the pin therein and further in which said sealing member comprises a rotatable sealing disc on the top of said float which can be periodically rotated to present a fresh surface to said water feed tube.

* * * * *